Sept. 7, 1965 R. TAESLER ETAL 3,205,304

METHOD OF AND MEANS FOR SYNCHRONOUS RECORDING OF TELEVISION IMAGE SEQUENCES

Filed Feb. 8, 1962

3 Sheets-Sheet 3

United States Patent Office 3,205,304
Patented Sept. 7, 1965

3,205,304
METHOD OF AND MEANS FOR SYNCHRONOUS RECORDING OF TELEVISION IMAGE SEQUENCES

Rudolf Taesler and Kurt Schlichting, Kiel, Germany, assignors to Zeiss Ikon Aktiengesellschaft, Stuttgart, Germany Filed Feb. 8, 1962, Ser. No. 181,495
Claims priority, application Germany, Feb. 8, 1961, Z 8,538
7 Claims. (Cl. 178—7.4)

This invention relates to an apparatus for the synchronous recording of image sequences reproduced by television means by means of a motion picture camera equipped with a view finder, the rotary shutter of the camera being formed under consideration of the specific selected recording method.

In the recording of television image sequences onto motion picture film various technical considerations have to be taken into account. Every television image sequence transmitted by means of interlaced scans is composed of successively reproduced half pictures or fields, whereby the first half picture is made up of odd numbered lines and the second half picture is made up of even numbered lines. These fields when transmitted in rapid succession appear to be a single frame. The lines of the second half picture are recorded between the lines of the first half picture. The half pictures of the image sequences of the aforementioned nature are separated by a so-called blanking interval during which the image field remains dark.

If it were desired to record the complete television pictures of the transmitted image sequences onto a motion picture film, it would be necessary to make provision that the portion of the film to be exposed to a complete television picture remains stationary during the recording of two half pictures and to advance the film during the blanking interval between each second half picture so that a new film portion will be exposed when starting the recording of a new complete television picture. An apparatus operating according to this known complete picture method for recording a television image sequence onto motion picture film, however, is very expensive since the film movement during the short blanking interval, 1.2 ms. for instance, requires very complicated equipment. Furthermore, it has to be made sure that the film movement takes place exactly during the blanking interval, that is, the image frequency and the phase of the television image sequence and of the motion picture image sequence have to be synchronized. This, likewise, requires relatively complicated equipment.

In order to reduce the cost of the equipment, the half picture recording method has been suggested in which only the first television half picture is used for the recording, while the reproduction time for the second half picture and both blanking intervals between the half pictures are utilized for the film movement. Thus, the equipment required for the film movement is less complicated. But also in this method it is necessary to maintain image frequency and phase position synchronous, as will be pointed out in more detail in the following.

If the motion picture frequency deviates from the television image sequence, the time period for the open position of the shutter of the motion picture camera is extended or decreased. Consequently, a portion of the first television half picture, which is composed of lines, will not be produced on the film (exposure time is too short, or a portion of the second half picture which is reproduced between the lines of the first one will also be reproduced on the film (exposure time is too long). In the first instance, a dark strip will appear in the film picture, and in the second instance a bright strip will extend through the film picture when the motion picture film is projected. The directions of movement of both strips are opposed to each other, that is, the dark strip moves from below in the upward direction and the bright strip moves from above in the downward direction. These dark or bright strips adversely affect the observation of the motion picture. Therefore, the image frequencies have to be synchronized.

The dark or bright strip in the film picture does not only occur as a result of deviations between the image frequencies. Provided that the image frequencies between the television picture and the film picture coincide, it is still possible that the changes of pictures in the television pictures and film pictures do not occur simultaneously. It will be appreciated that in such a phase displacement the boundary between two successively reproduced television half pictures has to appear somewhere in the film picture. If the shutter controlling exposure time of the motion picture film operates very accurately, it is theoretically possible that this boundary, though extending through the film picture, does not become visible. However, in actual practice, the open sector of the shutter will always deviate from the desired size and as a result of such deviation a few lines of the half picture will be missing if the open sector of the shutter is too small, or a few lines of the subsequent half picture will be reproduced between the lines of the preceding half picture if the open sector of the shutter is too large. Therefore, in the first instance a dark strip will be observed, and in the second instance a bright strip will be observed. These strips do not move, as is the case with deviating image frequencies, across the film picture but remain stationary.

It is also possible that both these deficiencies are added up or compensate each other.

Since these deficiencies may be encountered in all of the known recording methods, means had to be discovered to eliminate the same. The boundary between two half pictures has to be brought to the edge of the film picture and the film image frequency has to be maintained synchronous with respect to the television image frequency.

These conditions are met in some known arrangements by employing a synchronous motor for driving the motion picture camera whereby this motor is controlled by television impulses. Such arrangements operate completely satisfactory, require, however, rather complicated equipment and therefore are not economical in amateur work using small film, for instance 8 mm. film.

It is an object of the invention to employ a motion picture camera for synchronous recording of image sequences which are reproduced by television means, whereby this motion picture camera is equipped with a view finder and has a rotary shutter which is constructed under due consideration of the selected television recording method, and in which the view finder image is used as control means for the proper speed and phase position of the film picture in that the view finder image is covered up in dependence of the position of the objective shutter.

In accordance with another object of the invention, the rotational speeds of the objective lens shutter and of the view finder shutter are varied until the dark and bright strips which extend across the film picture and the view finder field if the television image sequence and the film recording is not synchronized, remain stationary at a predetermined location outwardly of the film picture or at the edge thereof.

In order to shift the dark or bright strips toward the edge of the view finder image, another object of the invention is to provide that the theoretically required rotational diaphragm speed for the image synchronization is temporarily adjusted to a value which is below or above this theoretical speed value.

Still another object of the invention is to provide a simple mechanism for practicing the method by means of a shutter which is interposed in the view finder ray path of the camera and is synchronously driven by the motor of the camera, whereby the portion of the shutter which permits an observation of the view finder image is of such a shape that the period of observation during each rotation of the shutter blade deviates from the exposure time for the film picture less than the duration of the recording of a television half picture (20 ms.). As a result, the dark or bright strip which determines the boundary between two half pictures appears more clearly in the view finder.

The invention contemplates further that the speed governor for the drive motor of the camera may be disconnected so that the speed of the motor may be manually adjusted. The shutter interposed in the view finder light ray path may be releasably mounted and may either alone or together with a common drive motor be attached to the shutter shaft of the camera. Since the rotating view finder shutter has to be accurately adjusted in its angular position with respect to the rotating objective lens shutter, means for a fine adjustment will be provided which permit a variation of the angular position of the view finder shutter relative to the objective lens shutter. In order to assure that the adjustment of the shutter speed required in each case may be effected without film consumption, the film conveying mechanism is made disengageable from its prime mover. The view finder shutter is conveniently made shieldable so as to permit unimpaired observation of the view finder image, whereby the shielding element is pivotally and/or releasably mounted on the camera housing.

With these and other objects in view the invention will now be more fully described in connection with a preferred embodiment which is based on the half picture-recording method; it will, however, be appreciated that the invention is not restricted to this particular type of recording method.

Figure 6:
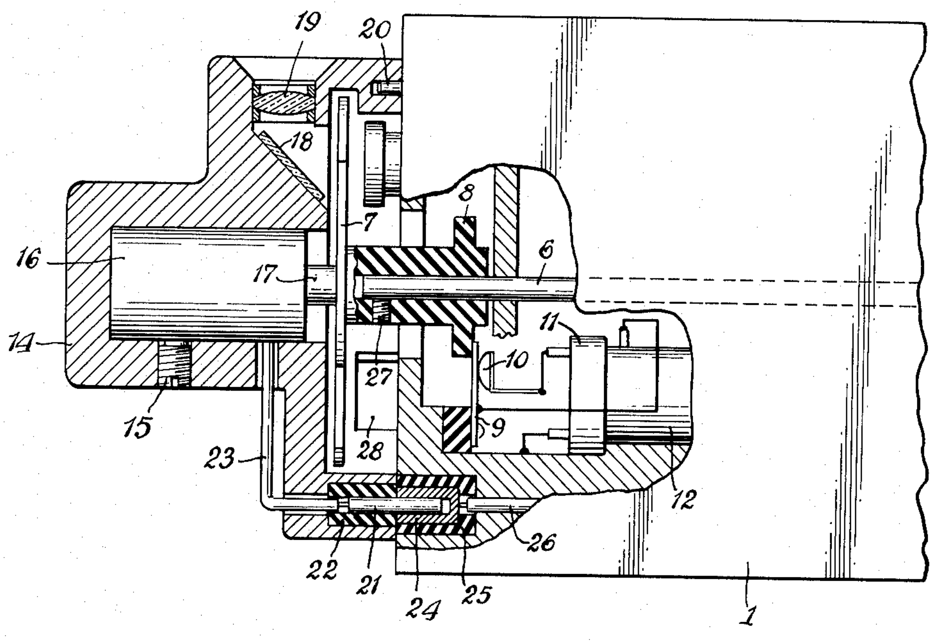

FIG. 6 is a view of the appliable unit containing motor, shutter and coupling devices by means of which the aforementioned unit can be coupled with the main mechanism of the camera. This unit consists of a housing 14, an additional motor 16 fixed in the housing 14 by a clamping screw 15, the motor shaft 17 being fastened to the view finder shutter disc 7 and its circular flange 8, a mirror 18, a view finder lens 19, a setpin 20 and a contact pin 21 in an insulating socket 22 with a connection 23. The setpin 20 has an appropriate setting hole in the camera body 1. The contact pin 21 gears in a contact socket 24 in the camera body 1, the contact socket 24 being housed in an insulating socket 25 and connected by a cable 26 to a source of current (not illustrated) in the camera body 1. The housing 14 is provided with a hole 28 opposite to a clamping screw 27 screwed in the circular flange 8 of the view finder shutter disc 7.

To allow working with the appliable unit a covering plate will be removed which in the simple design of the camera is covering the connecting piece of the shutter shaft 6 and the appropriate opening in the camera body 1. Then the unit is applied in such a way that the shutter shaft 6 is introduced into the hole of the circular flange 8 of the view finder shutter disc 7, the setpin 20 is introduced in its appropriate hole and the contact pin 21 is introduced in the contact socket 24. Through the hole 28 in the housing 14 the clamping screw 27 is tightened as soon as the view finder shutter disc 7 and the shutter 5 are adjusted to each other. Observation of the view finder image is done by means of the view finder lens 19 and the mirror 18. When working with the aforementioned unit, the speed governor 11 is switched as shown on FIG. 4.

Figure 1:
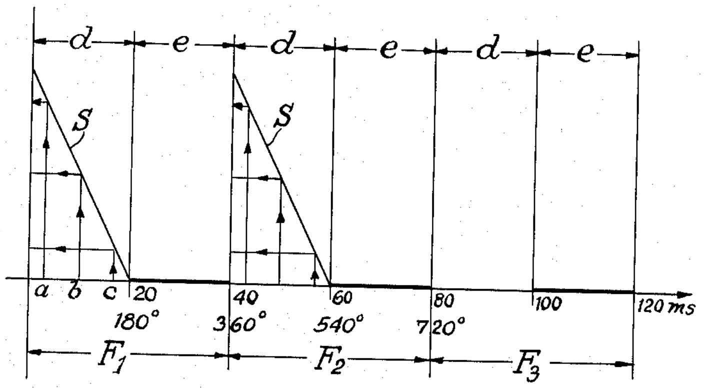
FIG. 1 is a schematic representation illustrating the half picture recording method.

FIG. 1 illustrates the half picture method of recording, whereby consecutive shutter positions and consecutive television pictures are plotted as abscissa and the various loci of the respective film picture are plotted as ordinate. In order to associate each line of the television picture with a predetermined exposed line on the film picture, the mirror line S has been introduced which reflects the individual lines *a*, *b*, *c*. In this manner the first lines of the half picture appear always above and the last lines appear always below on the film picture as is in fact the case in the recording.

In this representation the motion picture film is seen in an upright position in a side elevational view.

In FIG. 1 the reference characters *d* designate the first half pictures and *e* designate the second half pictures of the television image sequence.

$F_1$, $F_2$, $F_3$ . . . designate complete television pictures. It will be apparent from FIG. 1 that during the half picture recording every other half picture is shielded by the shutter and therefore is not recorded. During this time the film advance movement is carried out.

Figure 2:
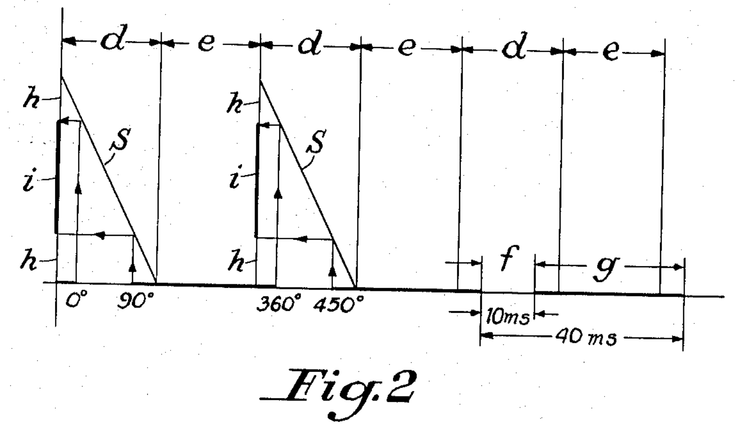
FIG. 2 is a schematic representation illustrating the view finder image obtained with the device according to the invention with correct rotational shutter speed and incorrect phase relation with respect to the television image sequence.

If in accordance with the invention the angular opening of the shutter for the view finder ray path is made, for instance, only one-half the size of the angular opening of the shutter which controls the film exposure, then a dark strip *h* will appear in the view finder, said strip being of a height which is equal to one half of the height of a television picture. This dark strip *h* may also lie divided at both sides of the bright picture portion *i* (FIG. 2). If the rotary speed of the camera shutter corresponds accurately to the television image impulse, the strip *h* remains stationary. If the camera speed is less than the television image impulse, it will move in a downward direction and in an upward direction if the camera speed is greater.

Figure 3:
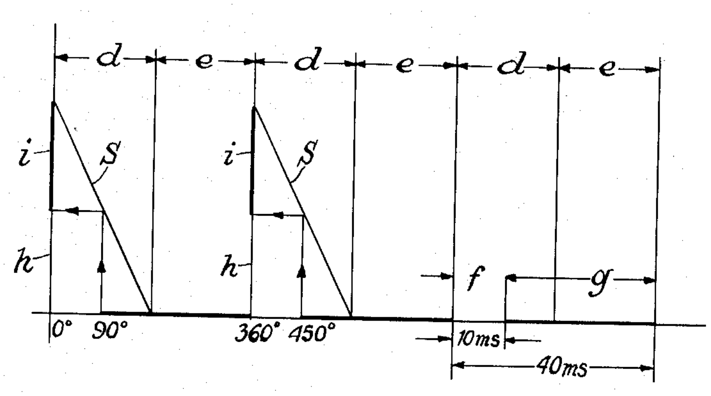
FIG. 3 is a schematic illustration similar to FIG. 2, with correct rotational shutter speed and correct phase relation relative to the television image sequence.

It is now possible by varying the speed of the camera drive to cause this dark strip *h* to travel until the strip coincides accurately with the edge of the view finder image. If the strip is now arrested in the aforementioned position by reestablishing the synchronization between the rotary speed of the camera shutter and the television image impulse, then both the image number and also the phase relation between the film camera and the television picture are in agreement (FIG. 3).

Figure 4:
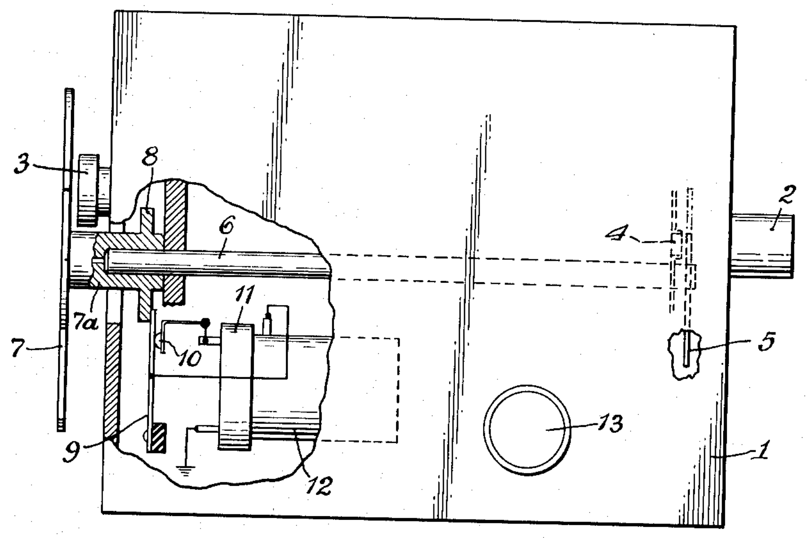
FIG. 4 is a side elevation view of the motion picture camera according to the invention.
Figure 5:
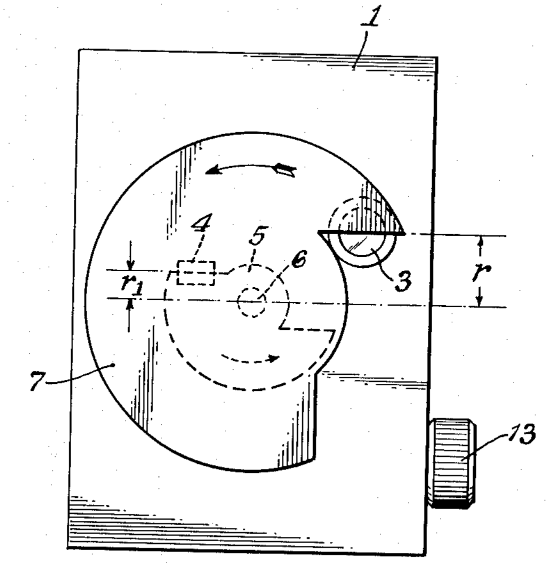
FIG. 5 is a view of the camera according to FIG. 4 when looking onto the wall provided with the ocular.

FIG. 4 illustrates the camera body 1 provided with an objective lens 2 and a view finder ocular 3. Rearwardly of the objective lens 2 is arranged a picture window 4 having a shutter 5 associated therewith. The shutter 5 comprises a disc which is mounted on one end of a shutter shaft 6 journaled in the camera body about an axis extending parallel to the axis of the lens 2. The shutter shaft 6 carries on its other end a view finder shutter disc 7. The shutter disc 7 is mounted on a cylindrical hub member 7*a* which in turn is mounted on the shutter shaft 6. A circular flange 8 on the hub member 7*a* bears against a switch 9 mounted on the camera body 1. The switch 9 is adapted to engage a contact 10 and short-circuits the speed governor 11 of the drive motor 12 which is likewise mounted on the camera body 1. A control knob 13 provided in the camera body 1 permits the adjustment of the speed of the drive motor 12. The shapes of the shutter disc 5 and of the view finder shutter disc 7 correspond to the requirement of the invention in that the opening edges and closing edges of the shutters which determine the light ray paths for the recording and the view finder, respectively, extend in the direction of a tangent to a circle having the shutter shaft 6 as a center, the radius of said circle being equal to the perpendicular distance $r$ or $r_1$ between the center of the view finder image window of the center of the picture window to the point of rotation of the shutter (FIGS. 4 and 5).

When the camera is in operation, the shutter 5 and the view finder shutter 7 open simultaneously. After a 90° turn the view finder shutter 7 is again closed even though the television half picture has been only half recorded. Upon completion of the recording of the television half picture, i.e. after a 180° rotation of the shutters, the shutter 5 is also closed. During a further 180° rotation of the shutters, the film is transported and is ready for a new exposure at the film window 4 at the start of a new rotation of the shutters.

It should be understood that only one-half of the view finder image can appear brightly to the eye of the observer, this image being shielded by the view finder shutter 7 during further exposure of the film in the picture window. The open time of the view finder shutter 7 is indicated in FIGS. 2 and 3 by the reference character $f$, and the closed time is illustrated by the reference character $g$.

What we claim is:

1. In a motion picture camera, an objective lens, a picture window in the rear of said objective lens, an optical view finder having an ocular, the optical axes of said objective lens and said view finder being arranged in axially spaced parallel relation to one another, a first rotary shutter arranged adjacent said picture window, a second rotary shutter arranged adjacent said ocular of said view finder, and means for rotating said second rotary shutter in synchronism with said first rotary shutter when producing motion pictures for television and coinciding the television picture frequency with the picture frequency of the camera.

2. Apparatus according to claim 1, including in the motion picture camera a drive motor and a speed governor for the same, means for disconnecting said speed governor from said motor, and means for manually adjusting the speed of said motor.

3. In a motion picture camera, an objective lens, a picture window in the rear of said objective lens, an optical view finder having an ocular, the optical axes of said objective lens and said view finder being arranged in axially spaced parallel relation to one another, a first rotary shutter arranged adjacent said picture window, a second rotary shutter arranged adjacent said ocular of said view finder, and means for rotating said second rotary shutter in synchronism with said first rotary shutter, said means including a common rotary shaft extending parallel to the optical axes of said objective lens and said view finder, said rotary shutters being provided each with a shutter blade fixedly mounted on said common rotary shaft, and means for driving said rotary shaft.

4. Apparatus according to claim 3, including means for detachably mounting said shutter for the view finder ray path on the rotary shaft which has said shutter for the camera lens mounted thereon.

5. Apparatus according to claim 3, in which said shutter blades have opening edges and closing edges which extend at least approximately in the direction of the tangent to a circle arranged concentrically about the axis of rotation of said shutter blades whereby the radius of the circle is equal to the perpendicular distance from the center of the picture window of the view finder and the objective lens, respectively, to said axis of rotation.

6. Apparatus for the synchronous recording of image sequences reproduced by television equipment by means of a motion picture camera equipped with a view finder and a rotary shutter suitably shaped in keeping with the selected television recording method, including a rotary shutter for the camera lens and a rotary shutter interposed in the view finder ray path of said motion picture camera, said shutter for the view finder being dimensioned in such a manner that the observation period for the image during one rotation of the shutter is different from the duration of the recording of a television field, and means for changing the angular position of said shutter for the view finder relatively to said shutter for the camera lens.

7. Apparatus for the synchronous recording of image sequences reproduced by television equipment by means of a motion picture camera equipped with a view finder and a rotary shutter suitably shaped in keeping with the selected television recording method, including a rotary shutter for the camera lens and a rotary shutter interposed in the view finder ray path of said motion picture camera, said shutter for the view finder being dimensioned in such a manner that the observation period for the image during one rotation of the shutter is different from the duration of the recording of a television field, and means for covering said view finder shutter, said covering means being pivotally mounted in said motion picture camera.

References Cited by the Examiner

UNITED STATES PATENTS

| | | | |
|---|---|---|---|
| 2,928,895 | 3/60 | Day | 178—7.4 |
| 2,982,171 | 5/61 | Debrie | 178—7.2 |

DAVID G. REDINBAUGH, *Primary Examiner.*